April 19, 1932.  F. W. ANDREWS  1,854,572
REFRIGERATING APPARATUS
Filed Sept. 27, 1929  2 Sheets-Sheet 1

Frank W. Andrews INVENTOR
BY
Spencer, Hardman & Fehr ATTORNEY

April 19, 1932. F. W. ANDREWS 1,854,572
REFRIGERATING APPARATUS
Filed Sept. 27, 1929  2 Sheets-Sheet 2
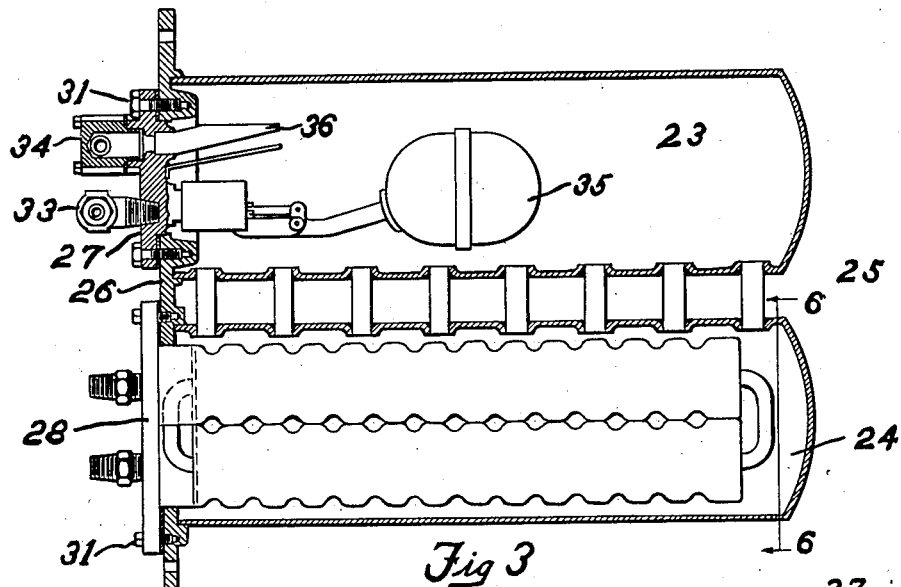
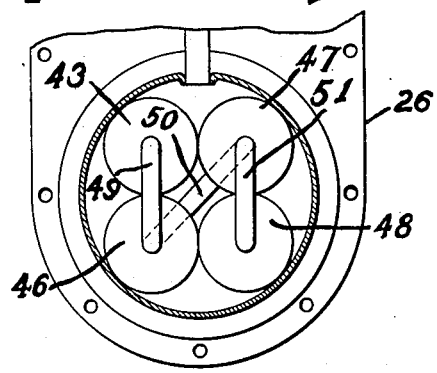
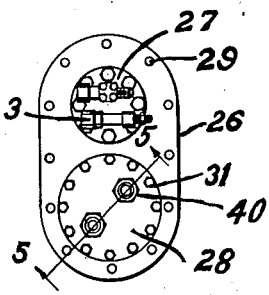
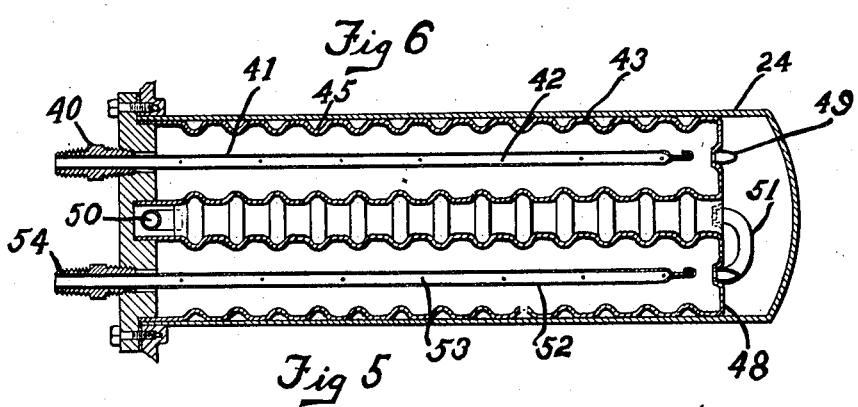
Frank W. Andrews INVENTOR
BY
Spencer Hardman & Fehr ATTORNEY Patented Apr. 19, 1932

1,854,572

UNITED STATES PATENT OFFICE

FRANK W. ANDREWS, OF FORT WAYNE, INDIANA, ASSIGNOR TO FRIGIDAIRE CORPORATION, OF DAYTON, OHIO, A CORPORATION OF DELAWARE

REFRIGERATING APPARATUS

Application filed September 27, 1929. Serial No. 395,589.

This invention relates to refrigerating apparatus and especially to refrigerating apparatus such as water coolers in which it is desired to cool beverages.

An object of the invention is to provide an efficient cooling means for beverages running through conduits and also those in containers such as bottles.

Another object of the invention is to provide a mechanical cooling unit in thermal contact with a beverage conduit both of which are inside an insulated cabinet and from which both the unit and the conduit can be readily removed.

Further objects and advantages of the present invention will be apparent from the present invention will be apparent from the following description, reference being had to the accompanying drawings, wherein a preferred form of the present invention is clearly shown.

In the drawings

Fig. 3 is an enlarged cross section through the cooling unit and beverage conduit of Fig. 2;

Fig. 4 is a left-hand side view of Fig. 3;

Fig. 5 is a cross section on line 5—5 of Fig. 4;

Fig. 6 is a view of the interior of the lower boiler on line 6—6 of Fig. 3, and

In a busy office or in one in which the noon hour is short or where suitable restaurants are not accessible, it is common practice for the employees who bring their lunch from home to purchase beverages such as milk for consumption during the lunch period. During hot days however, it may happen that if a beverage such as a bottle of milk is purchased in the early morning that by noon time such a beverage has attained an undesirable warm temperature. It is common practice however for all modern offices to provide a water cooler to quench the thirst of their employees, especially during the hot summer days. Accordingly it is one of the objects of this invention to provide a water cooler that will not only provide suitable cooled drinking water at all times but will also have storage space for other beverages such as milk in containers of the nature of bottles and the like.

It has hitherto been the custom to enclose both the mechanical cooling unit and the water conduits within the interior of the insulated water cooler in such a manner that when any trouble develops the cooling unit is not very accessible and the water conduits are still more inaccesible. It is an object of this invention to provide a water cooler in which the valves of the cooling unit and the inlet and outlet ports of that portion of the water conduits in thermal contact with the cooling unit are readily accessible from the exterior of the cabinet. Furthermore, it is another object of this invention to provide the combined cooling unit and water conduit in such a manner that both of these can be readily removed to the exterior of the water cooler for examination or cleaning or repair or replacement.

It is also the purpose of this invention to have effective cooling means whereby a large quantity of cool water is always available.

Figure 2:
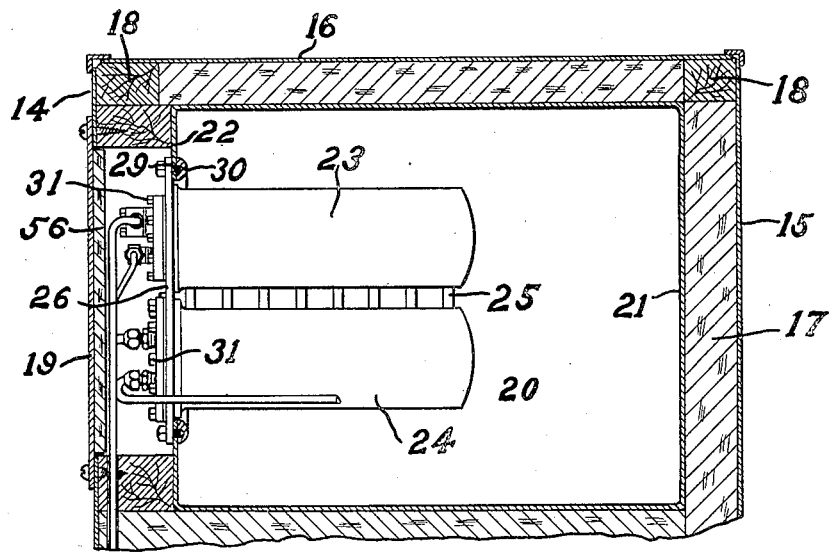
Fig. 2 is a longitudinal cross section through the upper portion of Fig. 1.
Figures 1, 7:
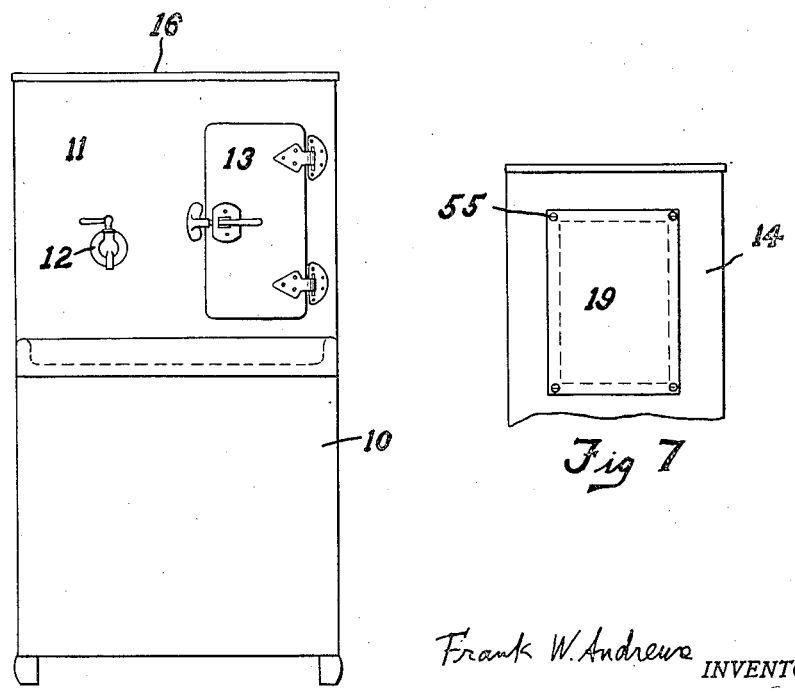
Fig. 1 represents a front view of a water cooler to which the invention has been applied.
Fig. 7 is a left-hand side view of the upper portion of Fig. 1 showing the exterior of the readily removable panel.

In Fig. 1 is disclosed a front view of a water cooler in which the invention has been applied. This water cooler comprises a base 10 having preferably concealed therein a refrigerant liquefying unit such as disclosed in the copending application of John A. Macready, Serial No. 308,927, filed September 28, 1928. The upper portion of this water cooler comprises a front panel 11 preferably having a draft means such as a faucet 12 and a door 13. The faucet may take other forms such as a bubbler.

This front panel 11 and the side panels 14, 15, rear panel not disclosed, together with the top panel 16, preferably enclose insulated walls 17. The insulation of these walls is preferably in the form of rock cork suitably sealed with a bituminous cement and supported in the framework 18 which is usually of wood. One of these side panels such as the panel 14 has preferably a smaller panel 19 readily removable by unscrewing the screws 55. A slab of insulation 56 may be attached to the cover 19 and removable therewith. If desired, a loose removable insulation such as kapok can surround the valves and ports hereinafter described.

Enclosed in this insulation is a compartment 20 lined with the lining 21. The door 13 opens to the interior of this compartment 20.

Preferably located at one corner of this compartment 20 is a cooling unit attached to one of the walls 22 of the lining. This cooling unit is preferably formed of an upper tank or boiler 23 and a lower tank or boiler 24 connected to each other by the tubes or conduits 25, and both extending in spaced superimposed parallel relation into the compartment. These plurality of boilers are preferably supported at its end by the plate 26 attached to the wall 22. Smaller plates 27 and 28 serve as closure members for each of the boilers 23 and 24 respectively. This plate 26 is more clearly disclosed in Fig. 4 with fastening means 29 for securing it to the lining of the wall 22. If the lining is not very thick, a supporting collar 30 may be placed on the inner side of the lining to receive the screws 29. Screws 31 are used to secure the plates 27 and 28 to the plate 26.

Plate 27 has the liquid refrigerant inlet valve 33 and the gaseous refrigerant return port and valve 34 located thereon. In the interior of the tank or boiler 23 is the float control 35 and gas return port 36 such as is more fully disclosed in the patent to R. G. Osborn, 1,556,708, issued October 13, 1925.

The lower plate 28 has a water or beverage inlet port 40. This port 40 preferably connects with a long tube 41 closed at the inner end and having a series of small holes 42 suitably spaced on its periphery. These holes open into an enclosing tube 43 surrounding the tube 41. This tube 43 is preferably attached to a portion of the plate 26 in the inside side of the boiler 24. The periphery of this larger tube or conduit 43 is preferably corrugated about its periphery as at 45 to allow a greater surface of the tube to be exposed to the liquid refrigerant that descends from the boiler 23 to the boiler 24.

It is preferable to have a plurality of tubes such as 46, 47 and 48 similar in construction to the tube 43 and connected in series thereto. From the tube 43 the drinking water or other beverage passes to the tube 46 by means of the conduit 49 and from there to the conduit 47 by means of a connection 50 in the front of the large boiler 24 and thence to the conduit 48 by means of the conduit 51 in the rear of the boiler 24. This last conduit 48 has preferably a tube 52 therein similar in construction to the tube 41 having a closed inner end and a plurality of holes 53 for the cold water to enter. This tube 53 is connected to the outlet port 54 and this in turn is connected to the faucet or other draft means 12. The inlet port 40 is of course connected to a source of city water or if desired, the upper portion of the water cooler may be designed to receive an inverted demijohn and the inlet 40 connected thereto.

It will be noted that the water follows a long and winding path through the conduits from the inlet port 40 to the outlet port 54. During this passage the water has had its undesirable heat extracted by the liquid refrigerant in the boiler 24. It will also be noted that the compartment 20 has a suitable empty space adjacent the insulated door 13 for the reception of containers of beverages such as milk bottles and the like. The compartment 20 is sufficiently chilled by the liquid refrigerant in the tanks 23 and 24.

Furthermore, it will be noted that if it is desirable to examine the valves or water ports that the screws 55 can be quickly unscrewed and the panel 19 and insulation 56 readily removed for such examination. If it is desired to remove the unit for cleaning the water pipes or repair or replacement of the parts of the boiler 23, the screws 29 can be removed and after shutting off the valves of the refrigerating and water systems, the entire unit comprising the two boilers and their contents can be quickly and readily removed to the exterior of the cabinet through the opening left by the panel 19.

Accordingly there has been disclosed a very efficient beverage cooler for cooling both beverages in containers and on draft. Furthermore, the cooling unit can be very readily removed to the exterior of the cabinet.

While the form of embodiment of the invention as herein disclosed constitutes a preferred form, it is to be understood that other forms might be adopted, all coming within the scope of the claims which follow.

What is claimed is as follows:

1. A water cooler comprising a supporting plate, a refrigerant boiler supported at its end by said plate, said plate being provided with an opening to the interior of said boiler, and a water tube in said boiler having means for sealing said opening, said means being provided with inlet and outlet water connections to said tube, said tube and said means being removable as a unit from said plate.

2. A water cooler comprising a supporting plate, a refrigerant boiler supported at its end by said plate, said plate being provided with an opening to the interior of said boiler, and a water tube in said boiler having means for sealing said opening, said means being provided with inlet and outlet water connections to said tube, said tube and said means being removable as a unit from said plate, said plate carrying a smaller plate provided with refrigerant inlet and outlet connections for controlling the refrigerant which passes to said boiler, said smaller plate being removable as a unit with said refrigerant connections from said first named plate.

3. A water cooler comprising a supporting plate, a refrigerant boiler supported at its end by said plate, said plate being provided with an opening to the interior of said boiler, and a water tube in said boiler having means for sealing said opening, said means being provided with inlet and outlet water connections to said tube, said tube and said means being removable as a unit from said plate, said plate carrying a smaller plate provided with refrigerant inlet and outlet connections including a valve and float control therefor, for controlling the refrigerant which passes to said boiler, said smaller plate being removable as a unit with said refrigerant connections from said first named plate.

In testimony whereof I hereto affix my signature.

FRANK W. ANDREWS.